United States Patent [19]

Ishii

[11] Patent Number: 4,729,042
[45] Date of Patent: Mar. 1, 1988

[54] CLOCK SIGNAL GENERATING CIRCUIT FOR DIGITAL SIGNAL RECORDING DEVICE

[75] Inventor: Hidehiro Ishii, Saitama, Japan
[73] Assignee: Pioneer Electronic Corporation, Tokyo, Japan
[21] Appl. No.: 769,646
[22] Filed: Aug. 27, 1985
[30] Foreign Application Priority Data
  Aug. 29, 1984 [JP] Japan .................... 59-181153
[51] Int. Cl.⁴ ............................................. H04N 5/94
[52] U.S. Cl. ........................................ 358/336; 358/343
[58] Field of Search ................. 358/336; 360/38.1, 32; 369/59

[56] References Cited

U.S. PATENT DOCUMENTS

| | | | |
|---|---|---|---|
| 4,403,262 | 9/1983 | Ito et al. ............................. | 360/38.1 |
| 4,555,734 | 11/1985 | Fukui ................................. | 360/38.1 |
| 4,604,659 | 8/1986 | Itoh et al. ........................... | 360/38.1 |
| 4,628,371 | 12/1986 | Kuroda .............................. | 360/38.1 |

Primary Examiner—Donald McElheny, Jr.
Attorney, Agent, or Firm—Sughrue, Mion, Zinn, Macpeak, and Seas

[57] ABSTRACT

A clock signal generating circuit for a data reproducing device, such as a device in which an audio signal is digitized and recorded in multiplex form together with other signals such as video signals, on a magnetic recording medium, wherein the stability of the frequency of the clock signal is maintained even in the presence of drop-out of the audio, video or other signals. The clock signal generating circuit includes a voltage-controlled oscillator receiving as a frequency-control input signal the output of a phase comparator comparing the output of the voltage-controlled oscillator with a pulse train signal extracted from the RF signal read from the recording medium. The voltage-controlled oscillator receives a second control signal which causes it to maintain its present frequency. The second control signal is produced by ORing drop-out signals generated when FM signals obtained by subjecting the video and audio signals to frequency modulation are no longer present in the RF signal.

3 Claims, 2 Drawing Figures

CLOCK SIGNAL GENERATING CIRCUIT FOR DIGITAL SIGNAL RECORDING DEVICE

BACKGROUND OF THE INVENTION

The present invention relates to a clock signal generating circuit, and more particularly to a circuit for generating a clock signal used to demodulate an audio signal which is digitized and recorded in multiplex form with other signals such as video signals.

An example of such a system is disclosed in Japanese Patent Application No. 45780/1983. In this system, a video signal and an audio signal are recorded in multiplex form, as a result of which an audio signal of wide dynamic range and high quality can be obtained. In this system, FM signals obtained by subjecting a video signal and an audio signal to frequency modulation and a pulse train signal obtained by digitizing the audio signal according to a predetermined digital modulation system are recorded in multiplex form on a recording medium.

The audio signal contains two channels wherein audio carriers of 2.3 MHz and 2.8 MHz are FM modulated with two respective audio channel signals. The video signal is subjected to frequency conversion in such a manner that the sync peak is 7.6 MHz, the pedestal level is 8.1 MHz, and the white peak is 9.3 MHz. Furthermore, the audio signal is digitized into a pulse train signal according to a modulation system such as a PCM (pulse code modulation) system. The pulse train signal is made suitable for recording, for instance, according to an EFM (eight-to-fourteen modulation) system. The resulting frequency spectrum has frequency components of pulses ranging from 3T to 11T in pulse width (where T is the bit period of the PCM signal, a pulse of 3 T corresponding to about 720 KHz, and a pulse of 11T to about 200 KHz). The pulse train signal is superposed on the video main carrier at a level of less than about one-tenth that of the main carrier can is slice amplified near the zero-crossing point to provide a pulse-width-modulated signal, which is then employed as the recording signal.

FIG. 1 shows the frequency spectrum of a RF (high frequency) signal obtained from a recording medium on which video and audio signals have been recorded according to the above-described recording system. In FIG. 1, reference character A designates a digitized audio signal component; B, an audio FM signal component; C, a color data component in a video FM signal; and D, a luminance data component in the video FM signal.

The dynamic range of the digitized audio signal can be made about 90 dB or more. Therefore, the tone quality upon reproduction of the digital audio signal is considerably high compared with the case where audio signals are recorded and reproduced employing the FM modulation system.

In general, a PLL (phase-locked loop) circuit is employed as a clock signal generating circuit for generating a clock signal to demodulate the digitized audio signal. The PLL circuit includes an oscillator and a phase comparator for subjecting the output of the oscillator and the pulse train signal to phase comparison. The output frequency of the oscillator is controlled by the output of the phase comparator. After the PLL circuit has reached the locked state, in order to maintain the PLL circuit stable, a holding circuit is provided which is adapted to maintain the oscillating frequency of the oscillator stable between two adjacent frame synchronizing signals in the pulse train signal.

The above-described conventional clock signal generating circuit suffers from the following difficulty: If the RF signal is irregular due to scratches or smudges on the recording medium, it takes a period of time (about 130 microseconds) corresponding to at least one frame before the irregularity can be detected. Therefore, in the conventional clock signal generating circuit, the oscillating frequency of the oscillator in the PLL circuit inevitably sometimes becomes irregular. Moreover, it is impossible to correctly demodulate the pulse train signal immediately after the irregularity of the RF signal is eliminated.

SUMMARY OF THE INVENTION

Accordingly, an object of the invention is to provide a clock signal generating circuit which can provide stable demodulating clock signals even if the recording medium has scratches, smudges, etc.

The clock signal forming circuit according to the invention is designed so that, in response to drop-out detection signals, the oscillating frequency of an oscillator of a PLL circuit is held stable.

DESCRIPTION OF THE PREFERRED EMBODIMENTS

A preferred embodiment of the invention will be described with reference to FIG. 2.

Figure 1:
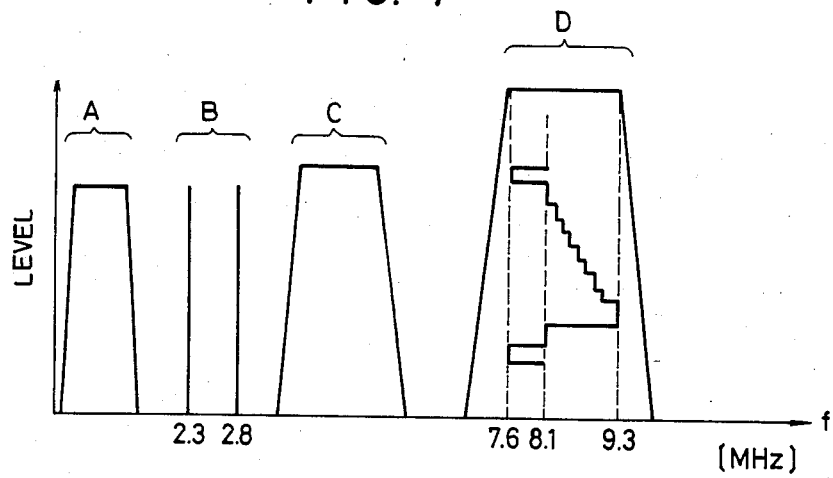
FIG. 1 is a diagram showing the frequency spectrum of an RF signal obtained from a recording medium in which FM signals obtained by subjecting video and audio signals to frequency modulation and a pulse train signal obtained by subjecting an analog signal to PCM modulation are recorded in multiplex form.
Figure 2:
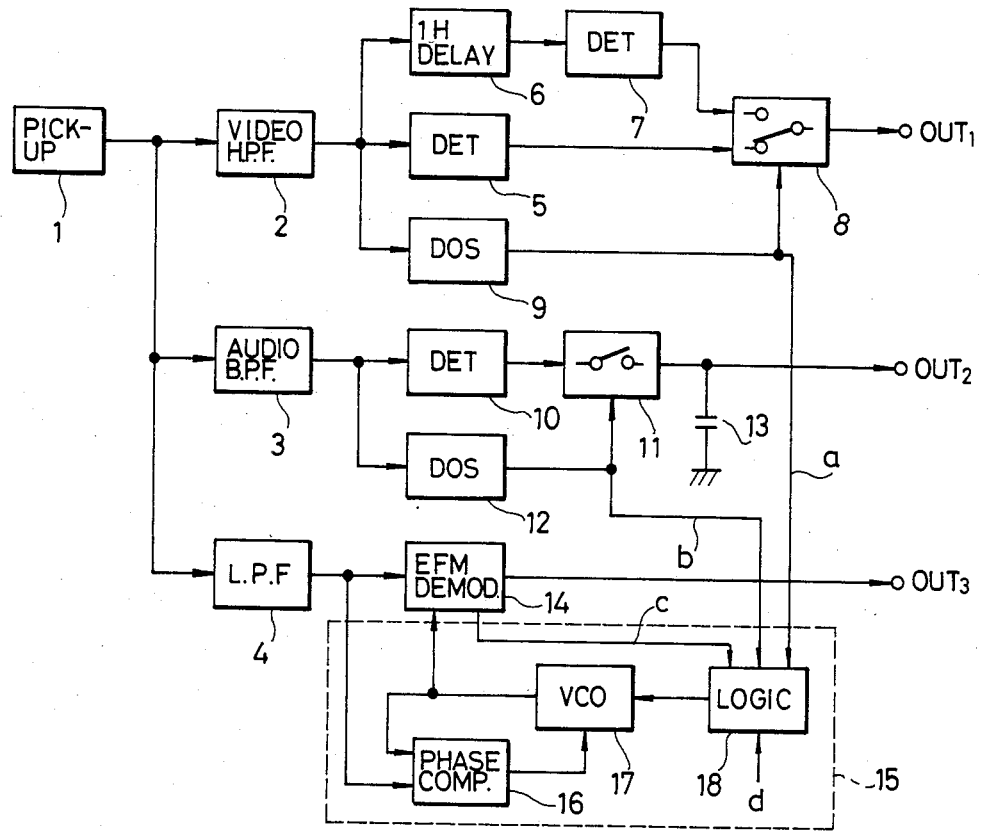
FIG. 2 is a block diagram showing a preferred embodiment of a data reproducing device of the invention.

In FIG. 2, a pickup 1 reads an RF signal from a recording disk, and the RF signal thus read is applied to filters 2, 3 and 4 which separate the different types of data from one another. An output extracted by the video signal extracting HPF (high-pass filter) 2 is applied to a video detector 5 where it is demodulated into a video signal. At the same time, the output of the HPF 2 is applied to a 1H delay circuit 6 where it is delayed for 1H (one horizontal synchronizing period). The output thus delayed is applied to a video detector 7 where it is demodulated into a video signal. The video signal outputted by the video detector 5 or the video signal outputted by the video detector 7 is selected by a video signal drop-out compensating changeover switch 8 and is applied to an output terminal $OUT_1$. A drop-out detection signal a provided by a drop-out detecting circuit 9 is applied to the control input terminal of the changeover switch 8. The drop-out detecting circuit 9 is designed so that a positive or negative pulse obtained in synchronization with the zero crossing of a video carrier component in the RF signal is employed as a trigger signal to drive a retriggerable monostable multivibrator (hereinafter referred to as "an RMMV" when applicable) having a predetermined time constant. The time constant corresponds substantially to the maximum period of the video carrier component. When the video carrier component is eliminated, the state of the RMMV is changed to output the drop-out detection signal a.

The output of the BPF (bandpass filter) 3, which transmits an audio carrier component of 2.3 MHz or 2.8 MHz, is applied to a detector 10 where it is subjected to FM detection to provide an audio signal. The audio signal is applied through a drop-out compensating switch circuit 11 to an output terminal OUT$_2$. A drop-out detection signal b outputted by a drop-out detecting circuit 12 is applied to the control input terminal of the switch circuit 11. The drop-out detecting circuit 12 is arranged in the same manner as the drop-out detecting circuit 9. The time constant of the circuit 12 is so determined that, when the audio carrier component is eliminated, the state of the RMMV is changed to output the drop-out detection signal b. The output terminal of the switch circuit 11 is grounded through a level holding capacitor 13. When the switch 11 is opened, the audio level provided immediately before the switch was opened is supplied to the output terminal OUT$_2$ to compensate for the drop-out.

According to the invention, the output of the LPF 4, which transmits only an EFM signal as a pulse train signal including digital audio data, is applied to an EFM demodulation circuit 14 and to a clock signal generating circuit 15. The EFM signal is compared with the output of a VCO (voltage-controlled oscillator) 17 by a phase comparator circuit 16 in the clock signal generating circuit 15, and as a result the phase comparator circuit 16 outputs a voltage corresponding to he phase difference between the EMF signal and the output of the VCO 17. The voltage is applied as a control input to the VCO 17. The VCO 17 oscillates at a frequency corresponding to the level of the control input. The VCO may receive a hold instruction signal from logic circuit 18 to hold the oscillation frequency provided immediately before the signal was received. The VCO 17 outputs a clock signal synchronous with bits which form PCM data included in the EFM signal, and the clock signal thus outputted is applied to the EFM demodulation circuit 14. In the circuit 14, with the aid of the clock signal outputted by the VCO 17, the PCM data in the EFM signal is converted into an audio signal. The EFM demodulation circuit 14 is designed so that, while the PCM data is subjected to demodulation, frame SYNC pulses in the EFM are detected, and when the number of clock pulses between adjacent frame sync pulses is not a predetermined value, a control signal c is produced. The audio signal outputted by the EFM demodulation circuit 14 is supplied to an output terminal OUT$_3$.

The control signal c outputted by the EFM demodulation circuit 14 is applied to logic circuit 18 in the clock signal generating circuit 15. In addition to the control signal c, the drop-out detection signals a and b, and a selection signal d from a control circuit (not shown) whose state is changed in a special operating mode such as a search operation mode or a scan operation mode are applied to the logic circuit 18. The circuit 18 is designed so that, according to the state of the selection signal d, it outputs the hold instruction signal only when one of the drop-out detection signals a and b is produced or only when the control signal c is produced. The hold instruction signal thus produced is applied to the VCO 17.

In the ordinary reproduction operation of the circuit thus constructed, if the RF signal is irregular because of scratches or smudges on the recording disk, at least one of the drop-out detection signals a and b is outputted, and the hold instruction signal is produced by the logic circuit 18. The detection time of the drop-out detecting circuit 9 is adapted so as to permit the output of the drop-out detection signal a in about 220 nanoseconds, this value being determined from the time constant of the RMMV. Similarly, the detection time of the drop-out detecting circuit 12 is about 1 microsecond. That is, the detection time of the drop-out detecting circuits 9 and 12 is extremely short. The oscillating frequency of the VCO 17 is held by the hold instruction signal outputted according to the drop-out detection signals a and b provided by the drop-out detecting circuits 9 and 12. Therefore, the clock signal outputted by the VCO 17, which is the output of the clock signal generating circuit 15, never become irregular.

Even if the RF signal is made irregular by a track jumping operation which may occur in the search operation mode or in the scan operation mode, the oscillating frequency of the VCO is maintained unchanged because the hold instruction signal is caused to be outputted by the control signal c of long detection time, and therefore, after the track jumping operation, a clock signal extracted from the EFM signal in the RF signal can be obtained in a short time.

In the above-described embodiment, the drop-out detection signals a and b are applied to the logic circuit 18 directly; however, the circuit may be modified so that only a drop-out detection signal which lasts for a predetermined period of time or longer is supplied to the logic circuit 18. Alternatively, the circuit may be designed so that a signal which is formed similarly to the drop-out detection signals a and b and lasts longer than the signals a and b is applied to the logic circuit 18. In this case, the frequency of erroneous operations due to the level variation of the RF signal or the deterioration of the laser power can be reduced.

As is apparent from the above description, the clock signal generating circuit according to the invention is designed so that the oscillating frequency of the oscillator forming the PLL circuit is maintained in response to the drop-out detection signals. Therefore, even if the RF signal become becomes irregular due to scratches or smudges on the recording medium, the oscillating frequency of the oscillator of the PLL circuit is held constant substantially instantaneously, and the PLL circuit is maintained stable. Therefore, even immediately after the irregularities of the RF signal have been eliminated, demodulation can be carried out correctly.

What is claimed is:
1. A data reproducing device, comprising;
pick up means for reading out an RF signal recorded on a recording medium;
filter means for separating said RF signal into an FM video signal component, an FM audio signal component, and a digital audio pulse train signal;
first drop-out detection means for detecting drop-out in said FM video signal component to produce a first drop-out detection signal;
second drop-out detection means for detecting drop-out in said FM audio signal component to produce a second drop-out detection signal;
oscillator means for producing an oscillating output at a frequency determined in response to a first control signal, and including means for holding a current frequency in response to a second control signal;
phase comparison means for comparing the phase of said oscillating output with the phase of said pulse train signal to produce said first control signal, said first control signal having a level corresponding to a phase difference between said oscillating output and said pulse train signal;

hold signal generating means coupled to at least said first and second drop-out detection means for producing said second control signal in response to at least one of said first and second drop-out detection signals; and means for demodulating said pulse train signal using said oscillating output as a clock signal.

2. A device as claimed in claim 1, further comprising first and second switch means respectively receiving said first and second drop-out detection signals as switching control inputs;

said first switch means being normally coupled at its input end to video detector/demodulator means outputting a non-delayed demodulated video signal, and, upon receiving said first drop-out detection signal, being coupled at its input end to video detector/demodulator means outputting a delayed demodulated video signal, an output end of said first switch means being coupled to a video output terminal;

said second switch means being coupled at its input end to an output of FM audio detector means receiving said FM audio signal component, and being coupled at its output end to an audio output terminal and a holding capacitor.

3. The data reproducing device of claim 1, wherein said hold signal generating means comprises OR means.

* * * * *